(12) United States Patent
Measson et al.

(10) Patent No.: US 9,049,593 B2
(45) Date of Patent: Jun. 2, 2015

(54) METHOD AND APPARATUS FOR RESTRICTING ACCESS TO A WIRELESS SYSTEM

(75) Inventors: Cyril Measson, Bridgewater, NJ (US); Aleksandar Jovicic, Jersey City, NJ (US); Lei Zhang, Evanston, IL (US); Ivan Klimek, Ganovce (SK); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 13/536,746

(22) Filed: Jun. 28, 2012

(65) Prior Publication Data

US 2014/0006787 A1 Jan. 2, 2014

(51) Int. Cl.
| | | |
|---|---|---|
| H04L 9/32 | (2006.01) |
| H04W 12/04 | (2009.01) |
| H04L 9/08 | (2006.01) |
| H04L 29/06 | (2006.01) |
| H04W 16/28 | (2009.01) |
| H04W 84/12 | (2009.01) |

(52) U.S. Cl.
CPC .............. *H04W 12/04* (2013.01); *H04L 9/088* (2013.01); *H04L 63/068* (2013.01); *H04W 16/28* (2013.01); *H04W 84/12* (2013.01)

(58) Field of Classification Search
CPC ..... H04L 9/088; H04L 63/068; H04W 12/04; H04W 16/28; H04W 84/12
USPC ........ 713/171; 726/7; 380/270; 370/334, 338
See application file for complete search history.

(56) References Cited

U.S. PATENT DOCUMENTS

| 6,134,662 | A | 10/2000 | Levy et al. |
| 6,816,595 | B1 | 11/2004 | Kudo |
| 7,715,353 | B2 * | 5/2010 | Jain et al. ....................... 370/338 |
| 7,904,723 | B2 | 3/2011 | Shin et al. |
| 2003/0061518 | A1 | 3/2003 | Yamaguchi |
| 2006/0221920 | A1 * | 10/2006 | Gopalakrishnan et al. ... 370/338 |
| 2007/0140494 | A1 * | 6/2007 | Kumoluyi et al. ............ 380/270 |
| 2009/0212972 | A1 | 8/2009 | Kellum |
| 2010/0002614 | A1 * | 1/2010 | Subrahmanya ................ 370/311 |

(Continued)

FOREIGN PATENT DOCUMENTS

| EP | 1530322 A2 | 5/2005 |
| EP | 2464050 A1 | 6/2012 |

OTHER PUBLICATIONS

Boppana etc., "How to create beam-forming smart antennas using FPGAS", Pub. Date: 2005, http://www.embedded.com/design/connectivity/4006442/How-to-create-beam-forming-smart-antennas-using-FPGAS, pp. 1-7.*

(Continued)

*Primary Examiner* — Krista Zele
*Assistant Examiner* — James Forman
(74) *Attorney, Agent, or Firm* — James K. O'Hare

(57) ABSTRACT

Techniques for securing a coverage of a wireless system provided by a stationary or mobile node are disclosed. The node may be provided with at least one encryption key. The key may comprise an encryption function table having therein varying functions, such as time-varying physical layer functions, such as transmit power or beam shape/direction of the node. In accordance with the key, coverage associated with transmissions from the node may be varied.

22 Claims, 12 Drawing Sheets

(56) References Cited

U.S. PATENT DOCUMENTS

| | | |
|---|---|---|
| 2010/0131751 A1 | 5/2010 | Reznik et al. |
| 2010/0189009 A1 | 7/2010 | Karaoguz |
| 2011/0205887 A1* | 8/2011 | Wu et al. ................. 370/229 |
| 2014/0157388 A1* | 6/2014 | Tsumura ........................ 726/7 |

OTHER PUBLICATIONS

Ohira, "Secret Key Generation Exploiting Antenna Beam Steering and Wave Propagation Reciprocity", Pub. 2005, pp. 1-4.*

Sheth et al., "Geo-fencing: Confining Wi-Fi Coverage to Physical Boundaries", Pub. 2009, pp. 1-17.*

International Search Report and Written Opinion—PCT/US2013/047981, International Search Authority—European Patent Office, Oct. 8, 2013.

Chapter II Demand and Article 34 Amendments with Response to Written Opinion; Apr. 8, 2014, PCT/US2013/047981.

International Preliminary Report on Patentability—PCT/US2013/047981, The International Bureau of WIPO—Geneva, Switzerland, Aug. 7, 2014.

* cited by examiner

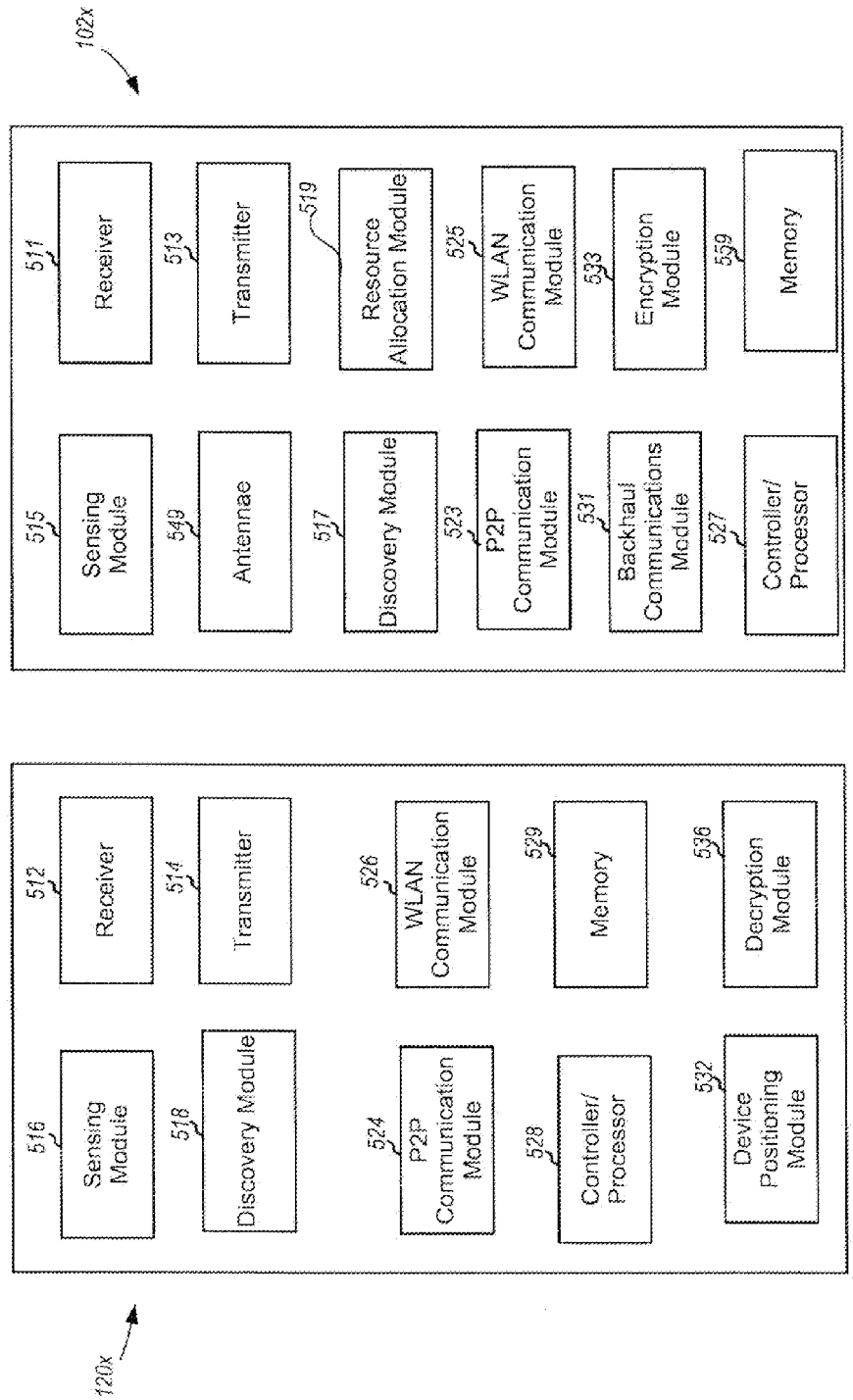

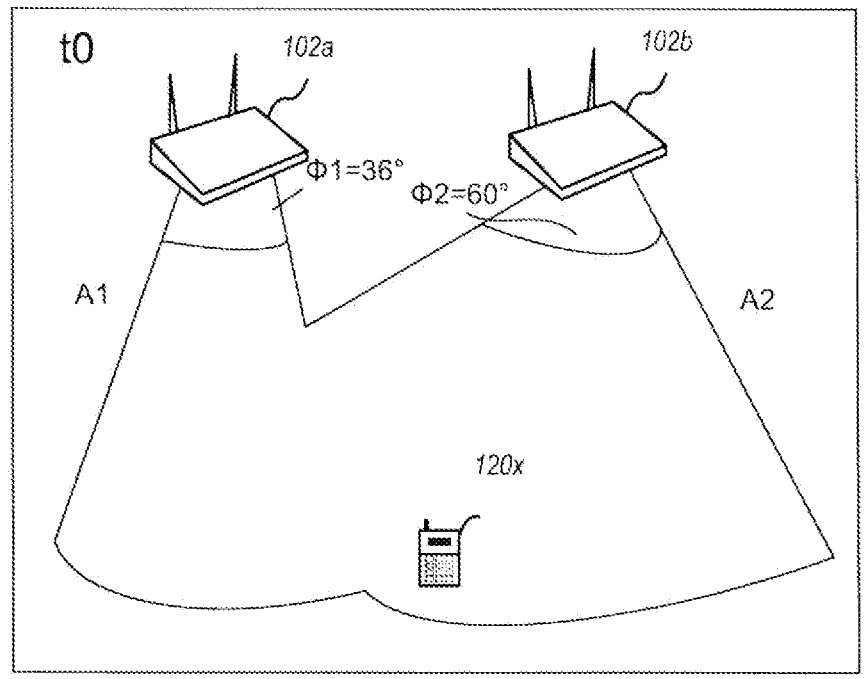
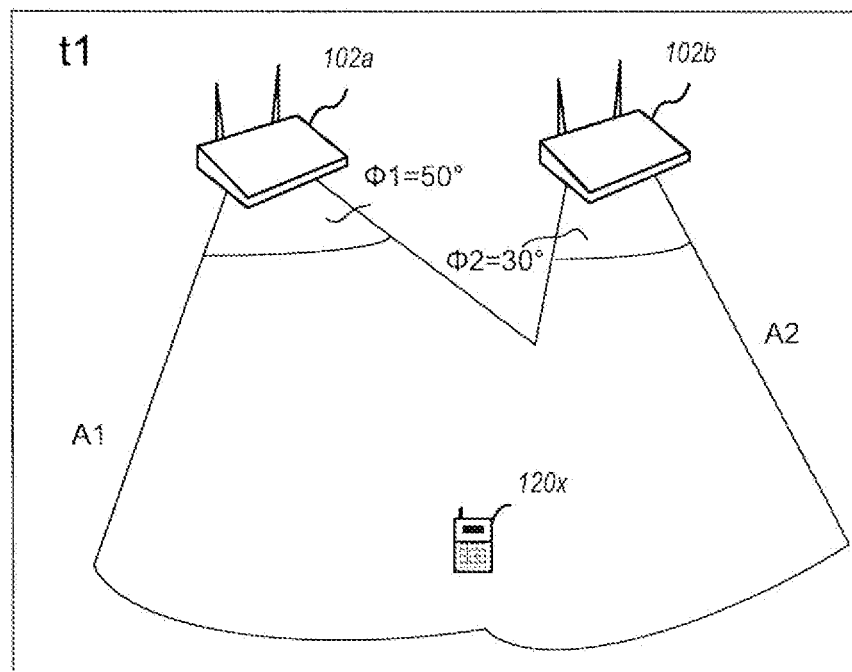
FIG. 6B

METHOD AND APPARATUS FOR RESTRICTING ACCESS TO A WIRELESS SYSTEM

BACKGROUND

I. Field

The present disclosure relates generally to communication, and more specifically to techniques for restricting access to a wireless system.

II. Background

Wireless communication networks are widely deployed to provide various communication content, such as voice, video, packet data, messaging, broadcast, and the like. These wireless networks may be multiple-access networks capable of supporting multiple users by sharing the available network resources. Examples of such multiple-access networks include: Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN). For example, a 3GPP Long Term Evolution (LTE), is a WAN standard that provides high speed data access, with latency on the order of 30 ms.

In contrast to a WAN, a local area network (LAN) may be provided wirelessly (WLAN). A WLAN may offer high data speeds, and decreased latency (on the order of 10 ms). A WLAN may be used to interconnect proximate devices by employing widely used networking protocols, such as Wireless Fidelity (WiFi), or, more generally, a protocol selected from the IEEE 802.11 wireless protocol family.

Proximate WiFi devices that are authorized to use a particular WLAN may access that WLAN to determine their current location with respect to the area serviced by the WLAN, to thereby enable use of that WLAN. More specifically, through transmissions of respective access points, and such as to enable WLAN communication, authorized WiFi devices may learn certain characteristics of the respective access points of the WLAN (e.g. the access points' physical location, transmit power, beam shape, and the like). Typical access points may implement known cryptographic techniques to secure such WLAN positioning and communications. Despite this use of cryptography in the known art, unauthorized devices may still overcome these known cryptographic techniques to determine positioning within the WLAN, thereby enabling unauthorized use of the associated WLAN.

Therefore, it may be desirable to substantially eliminate this unauthorized use, such as by employing alternate encryption techniques.

SUMMARY

The present disclosure provides techniques for restricting access to a wireless system.

In embodiments, apparatus, computer programs, methods and systems for varying coverage by a stationary or mobile node, such as a wireless access point in a wireless fidelity network, may be provided. In such embodiments, the node may be provided with at least one encryption key, which may be, for example, a physical layer encryption key function. The key may, for example, comprise an encryption function table having therein varying functions, such as time-varying physical layer functions, such as transmit power or beam shape/direction of the node. In accordance with the key, coverage associated with transmissions from the node may be varied.

Various and additional aspects and features of the disclosure are described in further detail below.

BRIEF DESCRIPTION OF THE DRAWINGS

FIGS. 3A and 3B show block diagrams of a WiFi device and an access point, respectively, according to embodiments of the present disclosure.

FIGS. 6A and 6B illustrate respective transmit powers and beam shapes of access points at varying times according to embodiments of the present disclosure.

DETAILED DESCRIPTION

Figure 1:
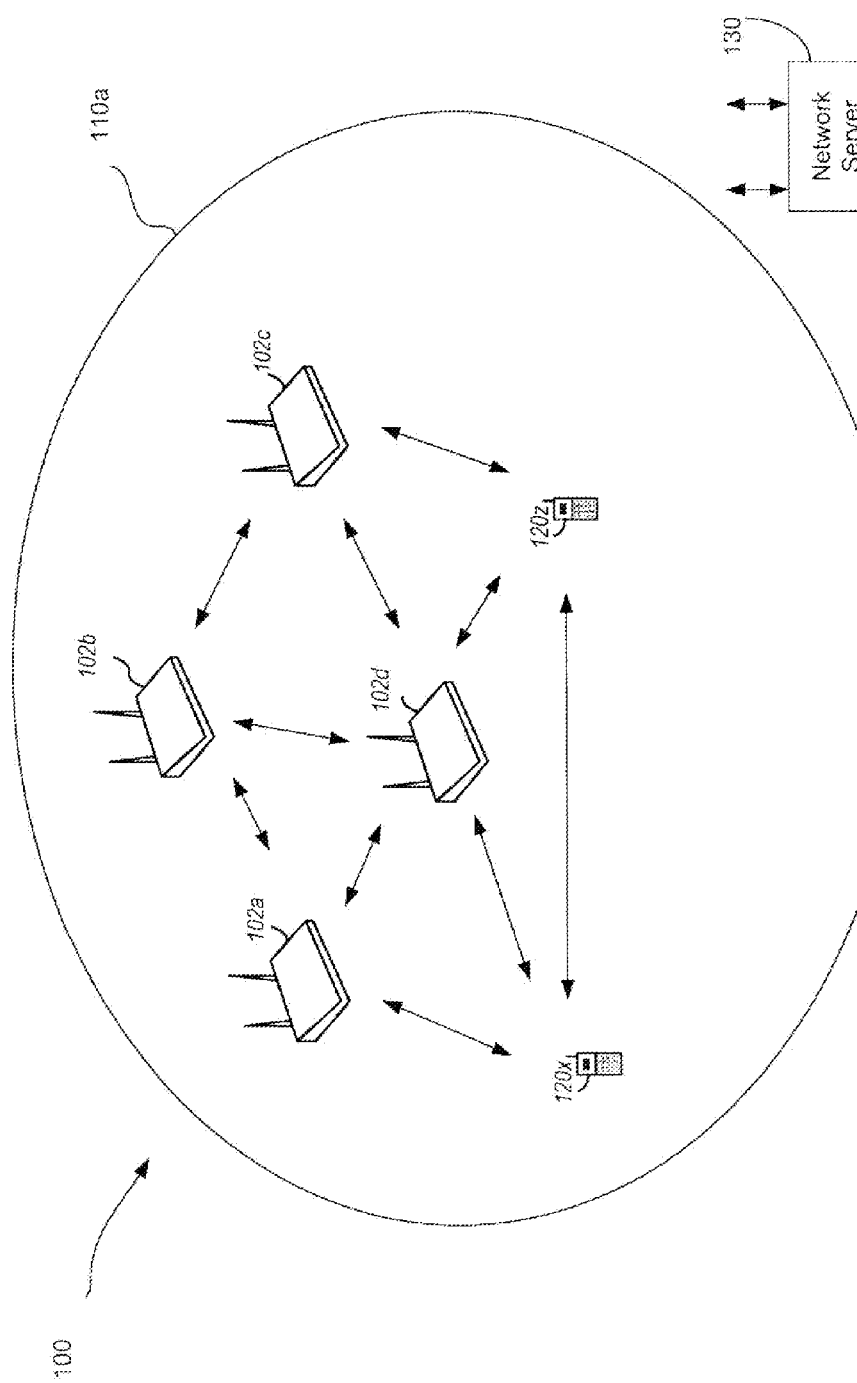
FIG. 1 shows a wireless communication network, which may be a WLAN network or other wireless network, according to embodiments of the present disclosure.

The figures and descriptions of the disclosure have been simplified to illustrate elements that are relevant for clear understanding, while eliminating, for the purposes of clarity and brevity, other elements found in typical telecommunications apparatuses, systems, and methods. Those of ordinary skill in the art will thus recognize the other elements and/or steps that are desirable and/or required in implementing the disclosure. However, because such elements and steps are well known in the art, and because they do not facilitate a better understanding of the present invention, a discussion of such elements and steps is not provided herein. The disclosure herein is nevertheless directed to all variations and modifications to the disclosed elements and steps that will be known or apparent to those skilled in the art in light of this disclosure.

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, and the like. For example, an OFDMA network may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, and the like. UTRA and E-UTRA are part of Universal Mobile Telecommunication System (UMTS). UTRA, E-UTRA, UMTS, as well as long term evolution (LTE) and other cellular techniques, are described in documents from an organization named "3rd Generation Partnership Project" (3GPP) and "3rd Generation Partnership Project 2" (3GPP2).

WiFi is typically deployed as a wireless local area network (WLAN) that may extend home and business networks. As referenced, the IEEE 802.11 standard defines WiFi communications as between devices, and as between devices and access points (APs). WiFi typically provides aggregate user data speeds from 2 Mbps (for 802.11b) to approximately 150 Mbps (for 802.11n). Typical speeds for WiFi are around 15 Mbps, and typical latency (i.e., packet delay) averages around 10 ms with no load. WiFi may link devices, and/or devices and APs, over distances from a few feet to several miles. By way of contrast, LTE and WiMax, as referenced above, typically provide WAN connectivity that may stretch for much greater distances, but which, due in part to increased latency, are typically not preferred for LAN communications. Of note, the techniques described herein may be used for the wireless networks and radio technologies mentioned above, as well as for other wireless networks and radio technologies.

WiFi networks, herein also referred to as IEEE 802.11 wireless networks, may operate in two modes: infrastructure mode and ad-hoc mode. In infrastructure mode, a device connects to an access point (AP) that serves as a hub for connecting wireless devices to the network infrastructure, including, for example, connecting wireless devices to Internet access Infrastructure mode thus uses a client-server architecture to provide connectivity to the other wireless devices. In contrast to the client-server architecture of infrastructure mode, in ad-hoc mode, wireless devices have direct connections to each other in a peer-to-peer architecture.

Referring now to FIG. 1, wireless network technologies may include both the afore-discussed WANs, and various types of WLANs. In an exemplary embodiment of a wireless radio network, WLAN 100 may be used to interconnect nearby devices by employing widely used networking protocols, such as using the IEEE 802.11 wireless protocol family.

In one aspect, WLAN 100, operating in infrastructure mode, may comprise various devices 120x and 120z, and APs 102a-102d, which APs may serve a coverage area 110a. An AP, as used herein, may be a station that supports communication for wireless devices associated with that AP. An AP may also be referred to as a WiFi base station. In general, a WLAN may include any number of APs. Each AP may be identified by an AP identity (APID), which may be a globally unique Medium Access Control (MAC) address (i.e., an address that provides a unique identifier in the MAC protocol layer) that is included in frames transmitted by the AP 102. APs 102a-102d may directly or indirectly couple to a network server 130 that may perform various functions. The network server 130 may be a single network entity or a collection of network entities.

In contrast, in ad hoc mode, also referred to herein as peer-to-peer (P2P) mode, one of the devices may provide some or all of the communication and communication management responsibilities of an AP 102a-102d and/or of the network server 130. These responsibilities may include a periodic beaconing process (such as for synchronization in peer discovery), and the authentication of new members, by way of non-limiting example. Accordingly, P2P mode may be used to connect devices together when there is no operating or present AP.

Thus, P2P mode, or P2P communication, as used herein, refers to direct communication between two or more devices, wherein the direct communication occurs without going through and/or without need of an AP. A P2P link, or variants thereof, thus refers to a direct communication link between two or more devices engaged in P2P communication. Correspondingly, a WLAN device is a device that is interested or engaged in WLAN communication, and a P2P device (otherwise known as an enhanced device) is a device that is interested or engaged in P2P communication. A device, as used herein, may be a WLAN device, or an "enhanced" device. As used herein, an enhanced WiFi device may be one that provides enhanced capabilities, such as for improved communications, increased power consumption efficiencies, increased other efficiencies, or the like.

A P2P group refers to a group of two or more devices engaged in P2P communication. In one design, one device in the P2P group may be designated as a P2P server (or a P2P group owner), and each remaining device in the P2P group may be designated as a P2P client. The P2P server may perform certain management functions, such as exchanging signaling with an AP of the WLAN, coordinating data transmission between the P2P server and the P2P client(s), and the like.

A wireless device, or "device," refers herein to a station that can communicate with another station or AP via a wireless medium. A device may be stationary or mobile, and may also be referred to as a mobile station, a user equipment, a subscriber station, etc. A device may be a cellular phone, a personal digital assistant (PDA), a handheld device, a wireless device, a laptop computer, a wireless modem, a cordless phone, a telemetry device, a tracking device, and the like. A device, and/or an AP, may also receive signals for satellites, which may be part of the United States Global Positioning System (GPS), the European Galileo system, the Russian Glonass system, or some other satellite Positioning System (SPS). A device may measure signals for APs 102a-102d, for other devices, and/or signals from the aforementioned satellites. The measurements may be used to determine the location and/or the connectivity of the device, the other devices, and/or the APs.

In the description herein, WLAN communication refers to communication between a device and AP(s). More specifically, WLAN communication is communication in the aforementioned infrastructure mode, such as for communication between the device and a remote entity, such as another device, via the AP(s). A WLAN link, and variants thereof, as used herein, thus refers to a communication link between a device and an AP(s).

More particularly, IEEE 802.11 defines a set of standards to carry out the WLAN communication that may occur in FIG. 1 as between devices 120x, 120z, and APs 102a-102d, at the physical (PHY) and MAC protocol layers.

Positioning in WLAN systems also relies on the exchange of beaconing signals between the APs and devices. In particular, APs periodically broadcast beacon signals that contain various communication-related information, including a time stamp, path loss information, AP characteristics, and supported data rates. The strength of these beacon signals may be measured and particularly used in positioning.

More specifically, beacon signals can be exchanged in two modes. In the positive scanning mode, devices listen to beacon transmissions from all APs. This is done as part of the communication functions in the WLAN 100 to decide which AP should be used by which device for communication (i.e., the AP with the strongest signal to noise ratio is typically chosen by the device for WLAN communication). In an alternative mode known as active scanning, the device sends the above-referenced probe requests to the nearby APs.

WLAN positioning systems thus operate, in part, based on the knowledge, transmitted via the beaconing process, of the relationship between physical positions and distinguishing features of the beacon received at the device. Specifically, WLAN positioning exploits the dependency between the location of a mobile device and the characteristics of beacon signals exchanged between the device and a set of physically distributed WLAN APs. In particular, four signal features may be used for positioning including Angle of Arrival (AoA), Time of Arrival (ToA), Time Difference of Arrival (TDoA), and Received Signal Strength (RSS).

AoA measures the direction of the radio wave incident on the device's antenna. Given two or more such angels, angulation may be used to determine the position of the device.

ToA measures the travel time of the radio signal from the transmitter to the receiver of a device. Since the radio signal travels at a known speed, the ToA may be used to determine the distance between the transmitter and the receiver. Given three or more such distances, circular lateration may be used to find the position of a device. TDoA measures the difference in ToA at two different receivers. Similar to ToA positioning, three or more TDoA measurements may be used to locate a device using hyperbolic lateration, and RSS measures the radio signal power received at the mobile device.

Although AoA has been used in WLAN positioning, its measurement requires specialized antennae leading to additional hardware cost. Moreover, ToA and TDoA require precise synchronization between transmitter and receivers, which is very difficult to achieve in WLANs. The RSS may be measured by the device to select the most appropriate AP for communication. The use of RSS is relatively simplistic, without the need for additional hardware or highly precise synchronization. This makes RSS the feature of choice in most WLAN positioning systems.

RSS decreases with increasing distance between the transmitter and receiver. Therefore, the location-dependency of RSS can be used to locate a device effectively. In particular, RSS is inversely proportional to the square of the distance between the transmitter and the receiver. The RSS may also be dependent upon the shape of a beam generated as a radiation pattern from an antenna transmitting electromagnetic waves converted from electrical signals by the associated transmitter. The beam may be formed through a technique known as beamforming Beamforming changes the shape of a beam by combining radio signals from a set of antennae to simulate a large directional antenna. By applying different combinations of antennae from the set, the gain of the large directional antenna may be affected, which may affect the RSS at the receiver. Therefore, given measurements of transmitted power, beam shape, and the RSS, the distance between the transmitter and the device may be determined.

One technique of applying RSS from APs to determine a physical location of a mobile device is fingerprinting. Fingerprinting uses training signals from a set of reference points (i.e. anchor points) with known locations. Fingerprinting may be implemented in two phases: the offline phase and the online phase. In the offline phase, such as when the network is being deployed, measurement of a fingerprint (e.g., received signal strength) of APs at respective locations within a target area (e.g., an indoor facility) may be carried out. These location fingerprints may then be stored in a database resulting in a so-called radio map to relate the AP characteristics and coordinates of the known locations. In the online phase, during the operation of the network, the fingerprint associated with a remote station at an unknown location is measured.

Figure 2:
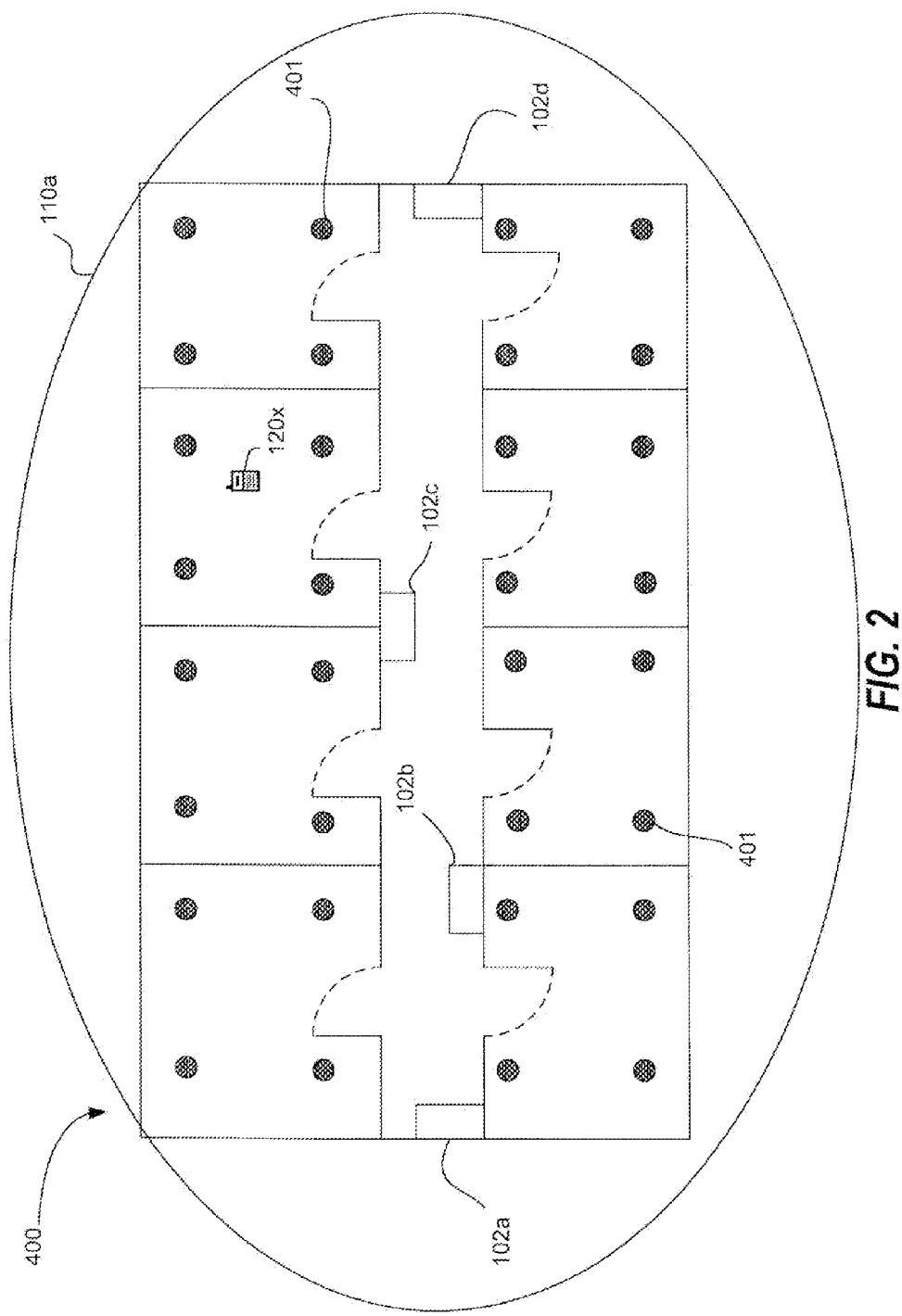
FIG. 2 is a layout of an indoor facility for which fingerprinting may be applied according to embodiments of the present disclosure.

FIG. 2 depicts a layout 400 of an indoor facility 407 for which fingerprinting may be applied using anchor points 401 with known coordinates with respect to access points 102a-102d. Throughout the facility, there is a plurality of fixed wireless APs 102a-102d that transmit information using control/common channel signals (e.g., probe request/response frames, as discussed above). Although FIG. 2 shows four APs, embodiments of the present invention may use any number of APs. Device 120x may monitor these transmissions. Each AP 102a-102d contains a unique hardware identifier, such as a MAC address. A device positioning module 532 of device 120x receives transmissions from the APs 102a-102d in its range and, using the beaconing characteristics of the AP transmitted signals, calculates the geographic location of the device 120x in the indoor facility by matching the beaconing characteristics with those of anchor points 401. Those characteristics include unique identifiers (i.e., MAC addresses) of the respective APs 102a-102d, the physical layout of the facility served by the coverage area 110a, the RSS at the device 120x, the transmit power of the signals from the APs 102a-102d, and the beam shapes of the respective APs 102a-102d.

The device positioning module 532 compares the observed APs' characteristics with those in its reference database (i.e., memory 529) of APs associated with the anchor points 401. This memory 529 may or may not reside in the device 120x, i.e., it may reside on a network server (not shown) or the like communicatively connected to the device 120x. Memory 529 contains, among other information, the calculated geographic locations and a power profile (such as RSS and beam shape) of each AP. Using these known locations and the characteristics, the device positioning module 532 calculates the position of the device 120x relative to the known positions of the APs 102a-102d, and may determine the device 120x's absolute geographic coordinates, such as in the form of latitude and longitude or latitude, longitude, and altitude within the indoor facility 407, as well as within any particular room 403 or hall 405 of the indoor facility 407.

FIG. 3A shows a block diagram of an enhanced WiFi device 120x capable of P2P communication and WLAN communication according to the disclosure. Within device 120x, a receiver 512 may receive signals transmitted by other devices for P2P communication, discovery signals, and downlink signals transmitted by APs for WLAN communication, by way of non-limiting example. A transmitter 514 may transmit P2P signals to other devices for P2P communication, peer discovery signals, and uplink signals to APs for WLAN communication, by way of non-limiting example.

A sensing module 516 may detect the presence of other devices, such as by using beacon signals received from APs, or peer discovery signals from other devices 120x and 120z Sensing module 516 may detect the presence of APs, such as using RSS and/or beam shapes, and/or may additionally measure channel gains, received power, and the like, for detected devices and for APs.

A discovery module 518 may receive discovery information from signals received by the receiver 512. The discovery module 518 may, based on this discovery information, modify subsequent discovery efforts, such as based on information additionally received from sensing module 516. Discovery module 518 may further direct collision avoidance techniques, as discussed herein, based on discovery information received from an AP 102, sensing module 516, and/or from other devices.

The device positioning module 532 receives signals from the receiver 512 and calculates the geographic location of the device 120x using the characteristics of the signals. As such, the device positioning module 532 is communicative with, and receives information from, sensing module 516 and discovery module 518.

A P2P communication module 524 may support P2P communication, for example, and may generate and process signals used for P2P communication. A WLAN communication module 526 may support WLAN communication, for example, and may generate and process signals used for WLAN communication.

Because APs in the WLAN in communication with device 120x may implement cryptography, or other security and data reliability techniques at the presentation layer, to secure communications, device 120x may include decryption module 536. Decryption module 536 may allow for discovery module 518 to perform discovery by decrypting secure information from, for example, an AP, to allow for discovery of the AP.

The various modules within device 120x may operate as described hereinthroughout. Further, a controller/processor 528 may direct the operation of various modules within device 120x. A memory 529 may store data and program codes for device 120x. For example, the memory 529 may contain the calculated geographic locations and other AP characteristics of respective APs, as referenced above.

FIG. 3B shows a block diagram of an AP 102x supporting P2P communication and WLAN communication. Within AP 102x, a receiver 511 may receive uplink signals transmitted by devices to support WLAN communication and P2P communication. A transmitter 513 may transmit downlink signals to devices to support WLAN and P2P communications. A memory 559 may store data and program codes for AP 102x.

If the AP 102x contains more than one antenna 549, the transmitter 513, through beamforming, may alter the shape of a beam as part of a radiation pattern for transmission of downlink signals responsive to the discovery module 517. The discovery module 517 may receive and generate for transmission discovery information, such as the afore-discussed beacon signals, including signals having a particular transmit power, from or to a device, or from or to other APs. The discovery module 517 may, based on this discovery information, modify subsequent discovery information, such as based on information additionally received from sensing module 515. Discovery module 517 may further direct collision avoidance techniques, as discussed herein, based on discovery information, sensing module 515, and/or information from other devices. Discovery module 517 may operate communicatively with encryption module 533.

A sensing module 515 may detect the presence of devices (120x, for example), may measure channel gains, received power, and the like, for example, of the detected devices (120x, for example). The detection of other devices by sensing module 515 may occur responsively to indications from discovery module 517, by way of non-limiting example. Sensing module may operate in communication with encryption module 533.

A resource allocation module 519 may allocate resources needed for P2P communication between devices. A WLAN communication module 525 may support WLAN communication for devices and may, for example, generate and process signals used for WLAN communication. A backhaul communication module 531 may support communication with other network entities (for example, other APs) via the backhaul. The various modules within AP 102x may operate as described herein. A controller/processor 527 may direct the operation of various modules within AP 102x. A memory 559 may store data and program codes for AP 102x.

APs of the WLAN may implement cryptography, or other security and data reliability techniques at the presentation layer, to secure communications to an authorized device, and such security and reliability techniques are carried out by encryption module 533. More particularly, the AP may communicate discovery information, as instructed by discovery module 517, in a secure manner based on security imparted to the beacon information via encryption module 533. For example, a WLAN's AP(s) may convey information using a cryptographic key, such as a private key.

For example, the device 120x may receive the encrypted information from the AP, and may desire to verify authority of the detected information. Accordingly, the device may receive a signed communication generated using a private key known to the AP(s) of the WLAN. The device may determine if the AP(s) own the information by determining (such as by responding to the AP(s) using the public key and awaiting confirmation that WLAN received the response) if the received information was generated using a first public key, which first public key must be confirmed as corresponding to the private key.

That is, this encrypted information may be encrypted (such as using the private key) by encryption module 533 and transmitted from the APs through antenna or antennae 549 at a particular transmit power level and a particular beam shape (e.g., beam width). Thereafter, the device 120x may decrypt, such as using the public key, the received information at receiver 512 using decryption module 536.

Figure 4A:
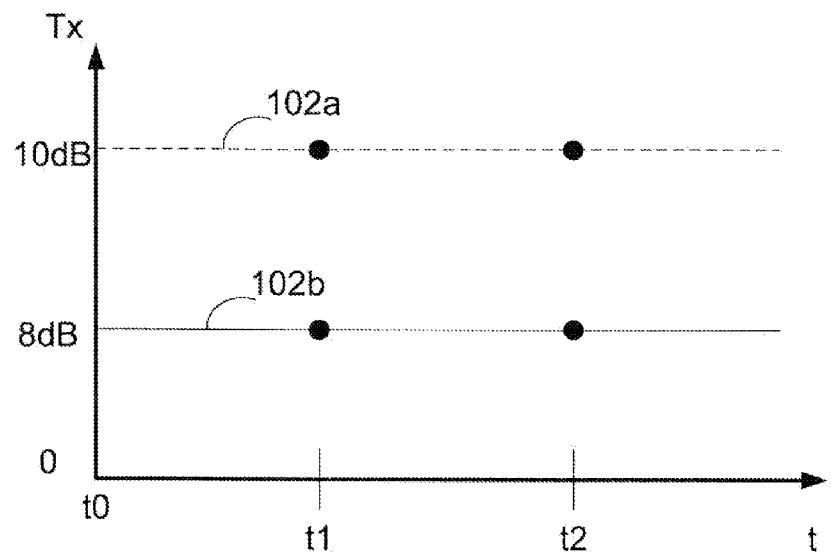
FIG. 4A is a timing diagram illustrating respective transmit powers of access points with respect to time according to embodiments of the present disclosure.

FIG. 4A is an illustration of a typical, known power level selection using which power selection the discovery (and/or data) information is transmitted from APs 102a-102b to a WiFi device (e.g. 120x), such as to enable device 120x to determine its position. In particular, FIG. 4A shows respective transmit powers of APs 102a, 102b with respect to time. As shown, for example, AP 102a transmits signals at a constant power of 10 dB, while AP 102b transmits signals at a constant power of 8 dB.

Figure 4B:
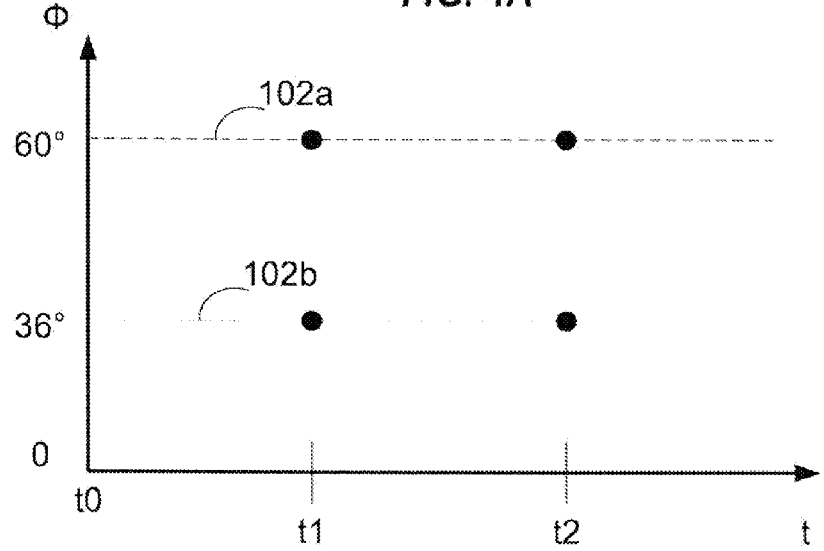
FIG. 4B is a timing diagram illustrating respective beam shapes of access points with respect to time according to embodiments of the present disclosure.

FIG. 4B is an illustration of APs 102a-102b transmitting using typical, known antenna pattern selection. FIG. 4B shows a configuration in which each AP is configured to form a beam radiating at a particular angle, which radiation angle stays constant over time. For example, AP 102a provides a beam having a width of 60 degrees, while 102b provides a beam having a width of 36 degrees.

However, despite the referenced use of cryptography at the presentation layer in known methods and systems, unauthorized devices may still be able to determine the location of APs, at least in part based on the fixed transmit power levels and fixed beam shapes illustrated in FIGS. 4A and 4B. For example, an unauthorized user may have previously been authorized, and therefore may have knowledge of some of the characteristics, such as the transmit power and the beam shape of the APs in the WLAN.

For instance, a hotel visitor may pay for, and accordingly may gain access to, a hotel's WLAN services for a set period of time. To gain this access, the visitor may enter a security code, which code satisfies the security at the presentation layer and thus allows the APs of the WLAN to authenticate the visitor's device. Upon being authenticated, the device receives the characteristics of the APs from the APs, wherein these characteristics are constant over time. This information may additionally include a unique identifier of the respective APs, the physical location of the APs in the particular indoor facility, the type of encryption implemented at the presentation layer, and the like. This information may then be stored in the visitor's device's memory 529. After the period of time for authentication expires, the hotel visitor in this example is no longer authorized to use the hotel's WLAN services.

However, despite the loss of authorization, the user's device may still have, in its memory, information concerning the respective APs of the hotel's WLAN. Unless the certain parameters of the APs are changed, the unauthorized user may, with relative ease, endeavor to decipher the particular security code (e.g., key, password, etc.) in the presentation layer to thereby gain access to the WLAN. Once access is gained, the device may simplistically determine its physical location based on the previously known, and constant, AP information.

To combat this unauthorized use, a WLAN may change certain characteristics of its associated APs. However, many such characteristics are not easily modified. For example, it may be particularly burdensome to regularly change the location of its APs, or to alter the layout of the geographical environment that the WLAN services. Thus, the WLAN may supplement the previously discussed security in the presentation layer with advanced encryption techniques, or with further security protocols in communication layers other than the presentation layer. However, advanced techniques typically take significant processing resources and overhead, and may thus be undesirable.

As such, embodiments of the present disclosure are directed to restricting unauthorized users from utilizing the APs of a WLAN, such as based on pre-existing knowledge of AP position, power levels, and/or beam shapes in a particular facility, to determine the user's location. The embodiments of the disclosure may employ encryption techniques at the physical layer, such as by using a private key function that varies the transmit power and/or the beam shape of the APs in a random or pseudo-random manner.

If physical layer characteristics, such as transmit power and/or beam shape of the respective APs are varied, even if an unauthorized user has knowledge of the transmit power or beam shape of the respective APs during the period of time he or she was authorized, re-authentication of the user will be difficult at least because the transmit power or beam shape varies with time. Accordingly, the now-unauthorized user will not be able to accurately determine a current location, due at least in part to the fact that the user's location (which is typically derived from the distance from the device's receiver to the transmitter of the APs) is dependent upon knowledge of the APs' transmit power (which allows the device to gauge distance) and beam shape (which allows the device to gauge directionality of a particular AP), which has changed since the time the user was authorized to utilize the particular WLAN. Therefore, if the APs act in a coordinate manner, they can form breathing cells such that positioning of a user's mobile device may be possible if the mobile device has knowledge, (e.g., a key) of the breathing change.

For example, the transmit power and/or the beam shape may be changed randomly, pseudorandomly, or from a pre-determined set of keys. In the case where the transmit power and/or the beam shape are changed from a predetermined set of keys, a particular key from the predetermined set may likewise be selected randomly or pseudorandomly. Further, the key may be changed at random times during the course of a week, month, year, and the like. However, it may preferable that the key is changed at least as frequently as an average user may return to a given facility to attempt to access the facility's WLAN. For example, if an average user attempts to gain access to a particular facility's WLAN to determine its position every 25 days, the WLAN may need to change the key of the WLAN's APs at least more frequently than once every 25 days.

Figure 5A:
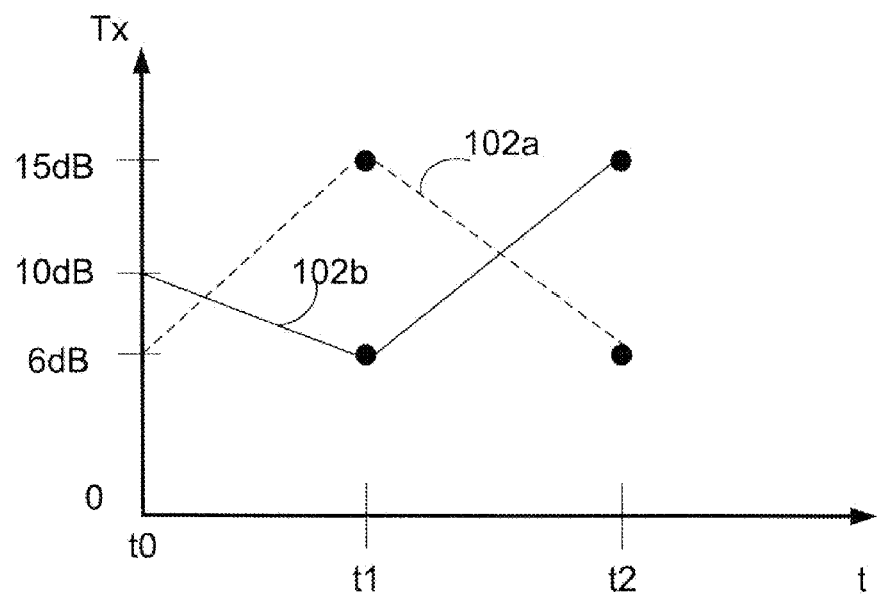
FIG. 5A is a timing diagram illustrating a variation of respective transmit powers of access points with respect to time according to embodiments of the present disclosure.

FIG. 5A is a timing diagram illustrating a variation of the transmit power according to the disclosed embodiments. In FIG. 5A, APs 102*a-b* do not transmit signals at a constant power level with respect to time. Rather, each (or one or more) AP's power transmission changes with time, each AP forms a breathing cell. By way of non-limiting example only, as shown in FIG. 5A, at t0, AP 102*a* may be configured to transmit signals at a power level of 6 dB, 15 dB at t1, and 6 dB at t2. Even though each AP's transmit power may decrease at certain times, to maintain a sufficient coverage of a particular area (110*a*, for example), the time-varying physical layer functions of APs 102*a* and 102*b* are coordinated (e.g., a predetermined relationship among the respective transmit powers of the APs may exist). Simply put, when AP 102*a*'s transmit power decreases, AP 102*b*'s transmit power may increase to maintain coverage, and vice versa.

Figure 5B:
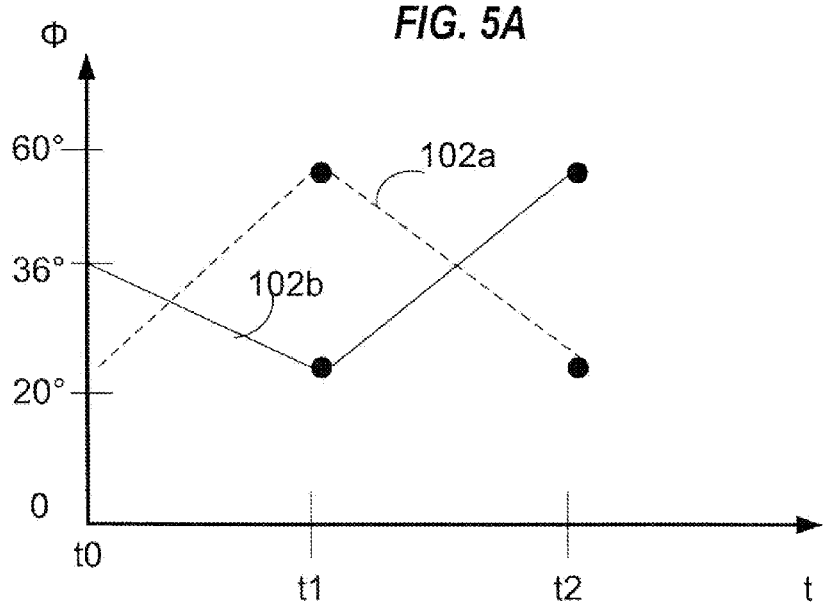
FIG. 5B is a timing diagram illustrating a variation of respective beam shapes of access points with respect to time according to embodiments of the present disclosure.

FIG. 5B is a timing diagram illustrating a variation of the beam characteristics, i.e. beam shape or direction, such as may be modified through beamforming, of antennae (e.g. 549 of 102*x*) of respective APs 102*a-*102*b* according to disclosed embodiments. In particular, FIG. 5B illustrates a variation of the respective beam shapes of APs 102*a-*102*b* with respect to time. Of course, those skilled in the art will appreciate, in light of the disclosure, that other manners of beam shape modification may be performed in accordance with the exemplary embodiments.

As shown, AP 102*a* may be configured to provide a beam with a width of 20 degrees at t0. However, in time, the beam width of the beam output by the transmitting antenna of AP 102 changes in this exemplary embodiment. For example, at t1, the AP 102*a* may change to provide a beam with a width of 60 degrees, and then to a beam having a width of 20 degrees at t2. Similarly to the aforementioned variation of transmit power, and in order to maintain a sufficient coverage of a particular area (110*a*, for example), the time-varying physical layer functions of APs 102*a* and 102*b* are coordinated (e.g., the respective APs may maintain a predefined relationship as between respective beam shapes and/or direction). For example, as the beam direction of AP 102*a* changes in one direction, the beam direction of AP 102*b* changes in another direction to compensate for any area not covered due to the change in beam direction of AP 102*a*.

Figure 6A:
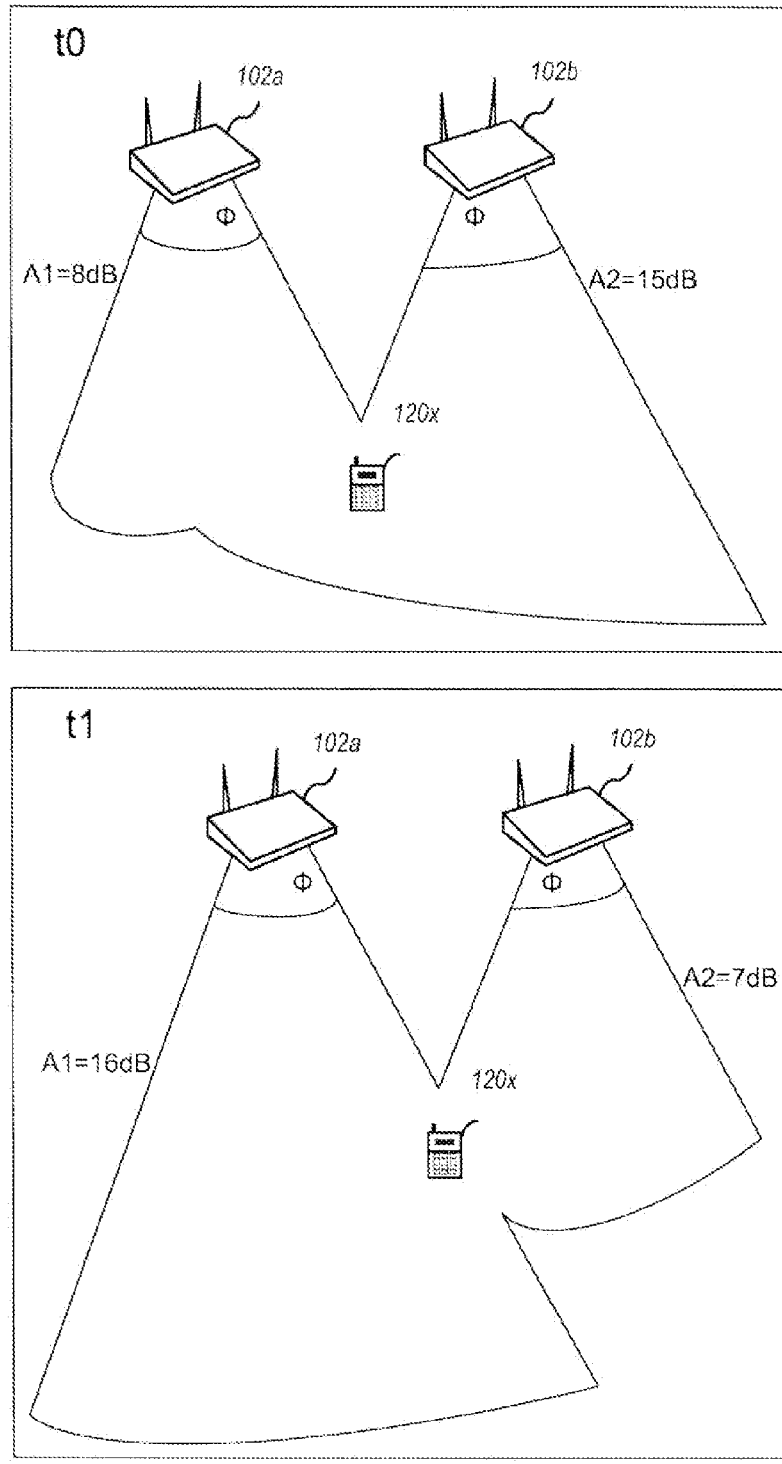

In a particular example of an embodiment of the present disclosure, FIG. 6A illustrates an exemplary transmit power and an exemplary beam shape of respective APs 102*a*, 102*b*, in a particular room of a facility at times t0 and t1, transmitting to a device 120*x*. In the example, at t0, APs 102*a*, 102*b* may have respective transmit powers (shown by the respective amplitudes A1 and A2) at 8 dB and 15 dB, respectively, with a beam shape that is at least partially defined by a beam width, Φ, at 36 degrees, for example. At t1, which may be any time period later than t0, the WLAN changes the transmit power of AP 102*a*, i.e., changes amplitude A1, to 16 dB, and changes amplitude A2 to 7 dB, while the beam shape remains constant. Further, although, the power levels change between t0 and t1, the coverage area is similar.

Those skilled in the art will appreciate that the WLAN network entity making such a modification may be, for example, a network hub. The network hub may be, for example, an AP communicative with others of the APs in the WLAN and that acts as an AP server, a network server or like network node communicative with one or more of the APs in the WLAN, a cellular base station communicative with one or more of the APs in the WLAN, a satellite connection communicative with one or more of the APs in the WLAN, or the like.

In another particular example, FIG. 6B also illustrates a transmit power and beam shape/direction of respective APs 102a, 102b, in a particular room of a facility at times t0 and t1, transmitting to a device 120x. However, unlike the example of FIG. 6A, the respective beam shape of APs 102a, 102b varies from t0 to t1. In particular, at t0, APs 102a, 102b may transmit signals with a beam having a shape with an angle $\Phi1=36$ degrees and $\Phi2=60$ degrees. At t1, which may be any time period later than t0, the WLAN may change the beam shape of the respective APs 102a, 102b to 50 degrees and 30 degrees, respectively, while the transmit power A remains constant. Those skilled in the art will further appreciate, in light of the disclosure, that physical layer encryption may be provided not only through the independent use of variations in transmit power or beam shape/direction, but additionally may include the combined use of variations in transmit power and beam shape/direction, either simultaneously or non-simultaneously, such as in an alternating format.

Figure 7:
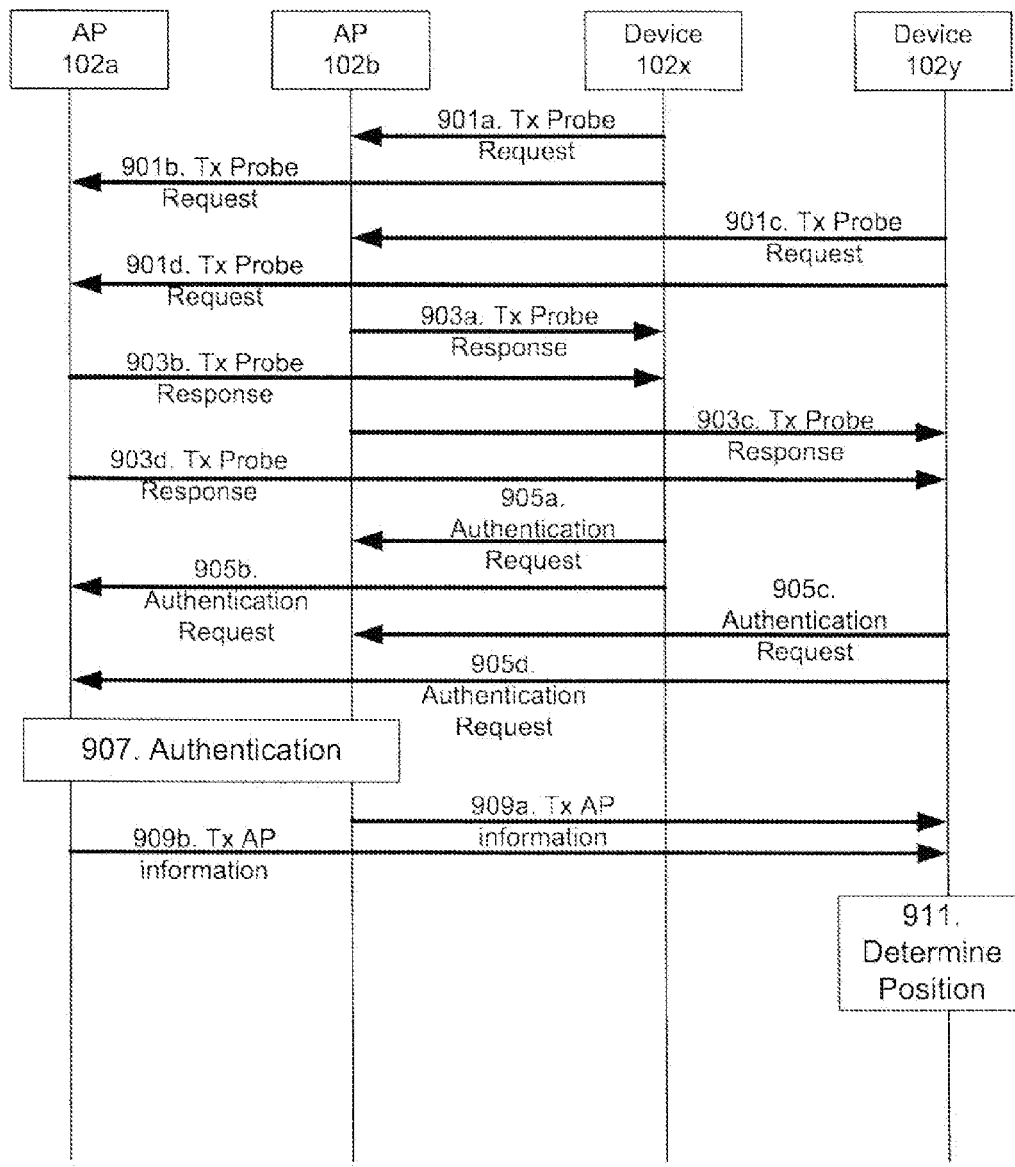
FIG. 7 is a signaling diagram illustrating signaling as between access points and devices according to embodiments of the present disclosure.

FIG. 7 is a signaling diagram illustrating signaling as between APs 102a, 102b and device 120x, which device 120x is capable of entering an area where it is not authorized to use a WLAN covering the area, and device 120z which device 120y is capable of entering an area where it is authorized to use the WLAN covering the area.

At steps 901a-901d, devices 120x, 120y may transmit probe request frames, allowing devices 120x, 120y to locate any APs (e.g., as shown APs 102a, 102b) within range, e.g., within WLAN 110. The probe request frames may contain an identifier of devices 120x, 120y respectively. At steps 903a-903d, APs within range (e.g., as shown APs 102a, 102b) may respond with probe response frames. Devices 120x, 120y may decide which APs are optimal for WLAN access, and may accordingly send authentication requests at steps 905a-905d.

At step 907, based on the respective identifiers, APs 102a, 102b may determine, through authentication, if each or either device 120x, 120y is authorized to use the WLAN, i.e., at step 907 APs 102a, 102b may determine whether either or both of devices 120x, 120y is authorized to determine its position based on characteristics of the APs and of the WLAN. For example, APs 102a, 102b may determine that device 120x is not currently authorized. Consequently, APs 102a, 102b may not transmit their respective physical layer profile information to device 120x

However, upon determining that device 120y is authorized, at steps 909a and 909b, APs 102a, 102b may transmit their respective profile information, such as their respective physical layer encryption profile, which may additionally comprise information obtained in the offline phase of the fingerprinting, to device 120y. In particular, APs 102a, 102b may transmit at least their respective physical locations and physical layer encryption key information. The encryption key information may include, for example, at least one of a cryptographic function indicating at least one of a time varying transmit power function, and a time varying beam shape/direction function. This information is then stored in device 120y's memory. Based on this received and stored information, device 120y may decrypt the physical layer encryption functions, such as to decipher its current position and make use of the WLAN in the facility, at step 911.

Figure 8:
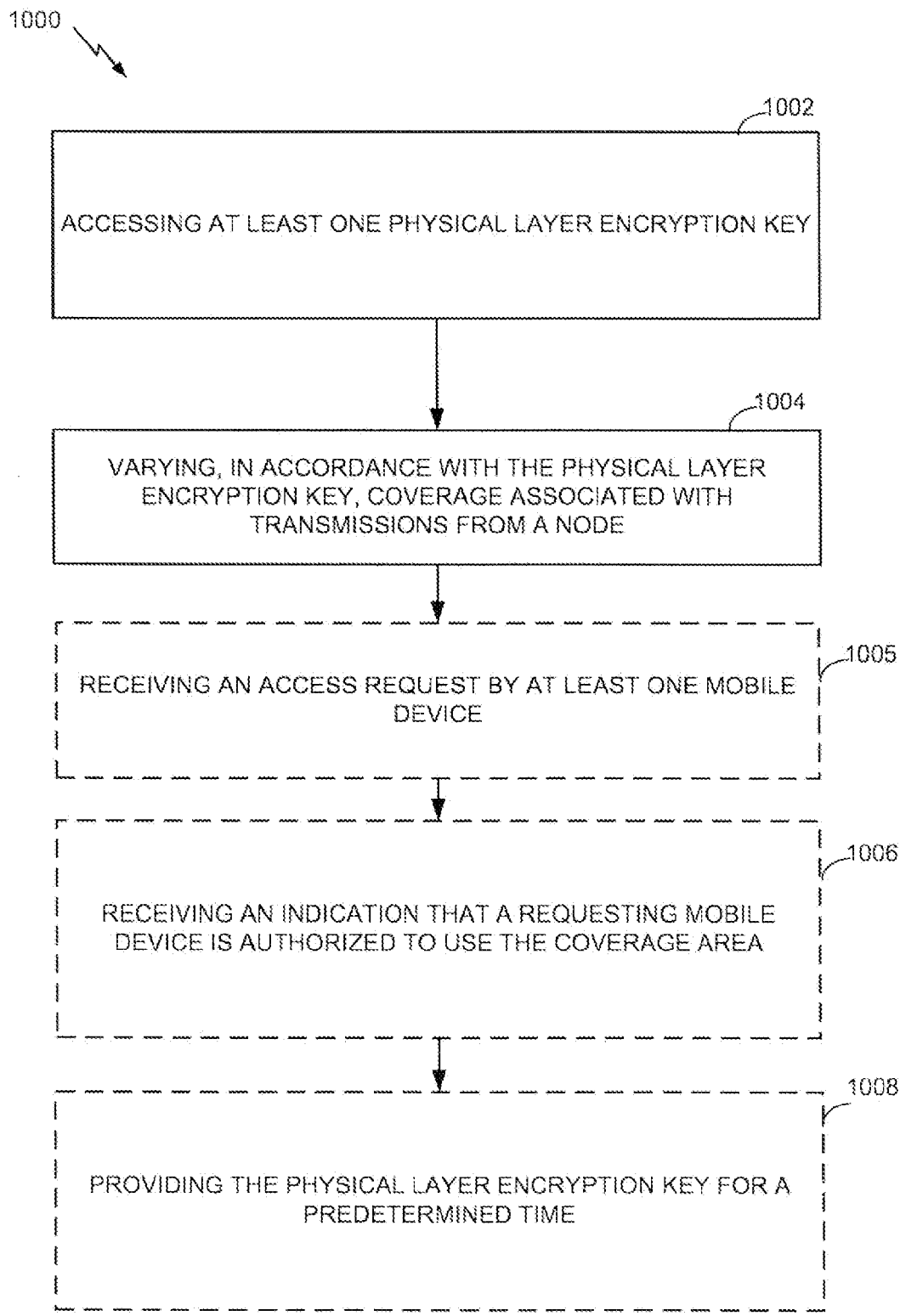
FIGS. 8 and 9 are flow diagrams illustrating methods of varying a coverage area of a node according to embodiments of the present disclosure.

FIG. 8 is a flow diagram illustrating a method 1000 for a variation of coverage, such as to provide network security, by a stationary or mobile node. At step 1002, the node may be provided with at least one encryption key. This key may be a private key which may be used to convey information (e.g., to secure messages, data, and the like), or may be a public key. The key may, for example, comprise an encryption function table having therein varying functions, such as time-varying physical layer functions, such as transmit power or beam shape/direction of the node, or the key may comprise an index to such a function table. The key may be varied at predetermined intervals. The key may be randomly generated, pseudo randomly generated, or may be selected from a set of available keys, wherein the set may have a predetermined size. For example, a key set may include 10 keys, and keys may be selected from the set. Additionally, different sets may be available at different times, wherein the set-in-use may be varied, and wherein each set may have a different size, or may have the same size, i.e., each set may have between 5 and 15 keys, or each set may have 10 keys.

In optional embodiments, the functions may include and/or may account for dependencies on physical layer aspects of at least one other node proximate to the coverage provided by the node. The key may be received, such as via download to the node, from, for example, a WLAN of which the node is a member. More particularly, a controller associated with the WLAN may provide the key to the node at step 1002.

At step 1004, in accordance with the key, coverage associated with transmissions from the node may be varied. At optional step 1006, responsive to an access request by at least one mobile device received at optional step 1005, the node may receive an indication, such as based on an identification of the mobile device exchanged to the WLAN, that the requesting mobile device is authorized to use the coverage area. Further, the assessment of an authorized device at step 1006 may also be made principally by the node, such as via a comparison by the node of the received device identifier to a listing of authorized device identifiers, wherein the listing may reside at, and periodically be updated at, the node, or wherein the listing may reside at a server or like storage location associated with the WLAN. Accordingly, at optional step 1008, key may be at least temporarily provided and valid, such as via download, for a predetermined time, such as 24 hours, to the requesting, authorized mobile device.

Figure 9:
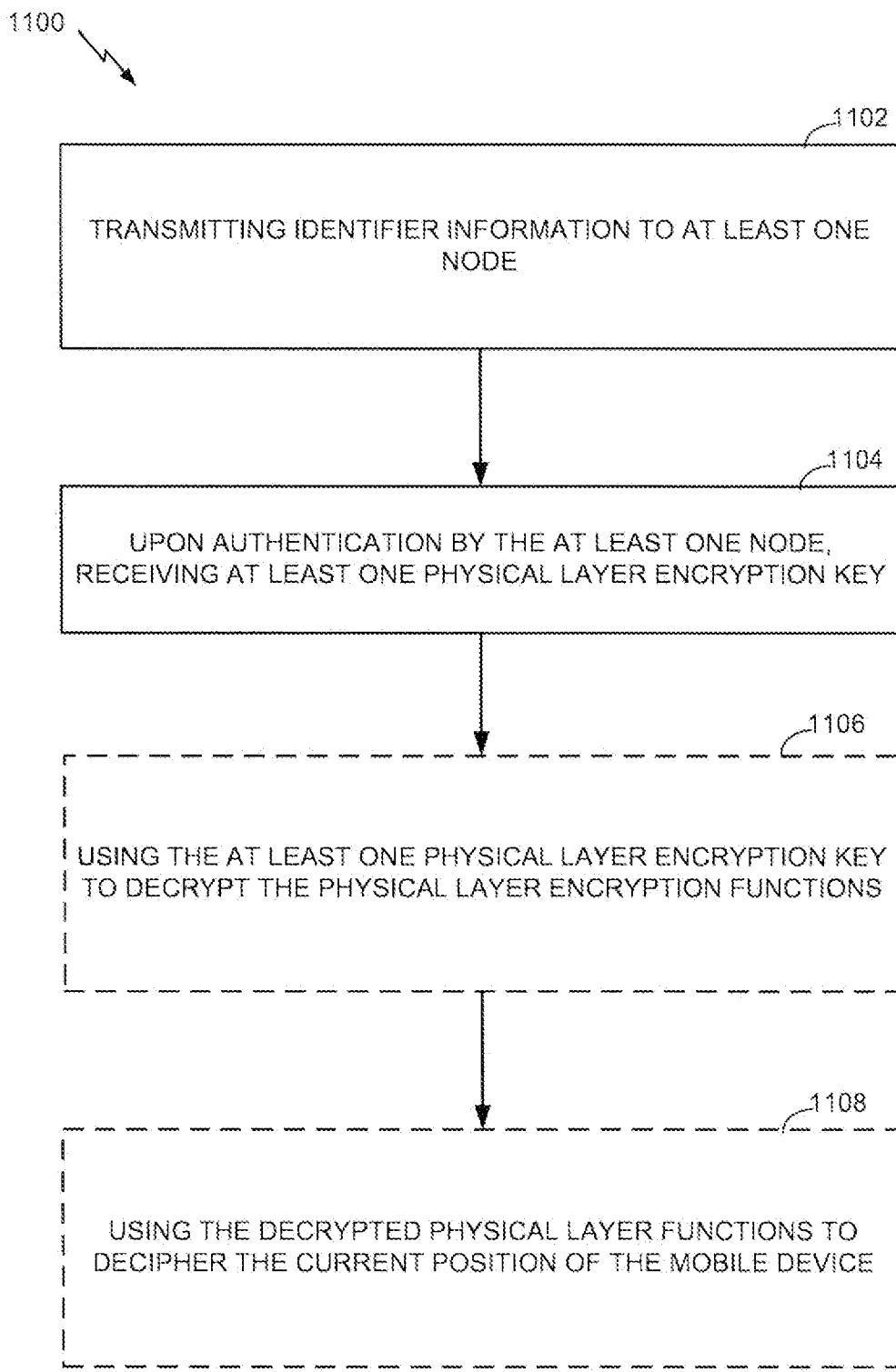

FIG. 9 is a flow diagram illustrating a method 1100 for a mobile device accessing coverage of at least one node (being stationary or mobile). At step 1102, the mobile device may transmit identifier information to the at least one node, to thereby request authorization to access a WLAN of which the at least one node is a member. Upon authentication by the at least one node, at step 1104, the mobile device may receive a physical layer encryption key. This key may be a private key which may be used to convey information (e.g., to secure messages, data, and the like). The key may, for example, comprise an encryption function table having therein varying functions, such as time-varying physical layer functions, such as transmit power or beam shape/direction of the node. In optional embodiments, the functions may include and/or may account for dependencies on physical layer aspects of at least one other node proximate to the coverage provided by the node. At step 1106, the mobile device may use the physical layer encryption key to decrypt the physical layer encryption function(s). At step 1108, the mobile device may use the decrypted physical layer functions to decipher the mobile device's current position.

Figure 10:
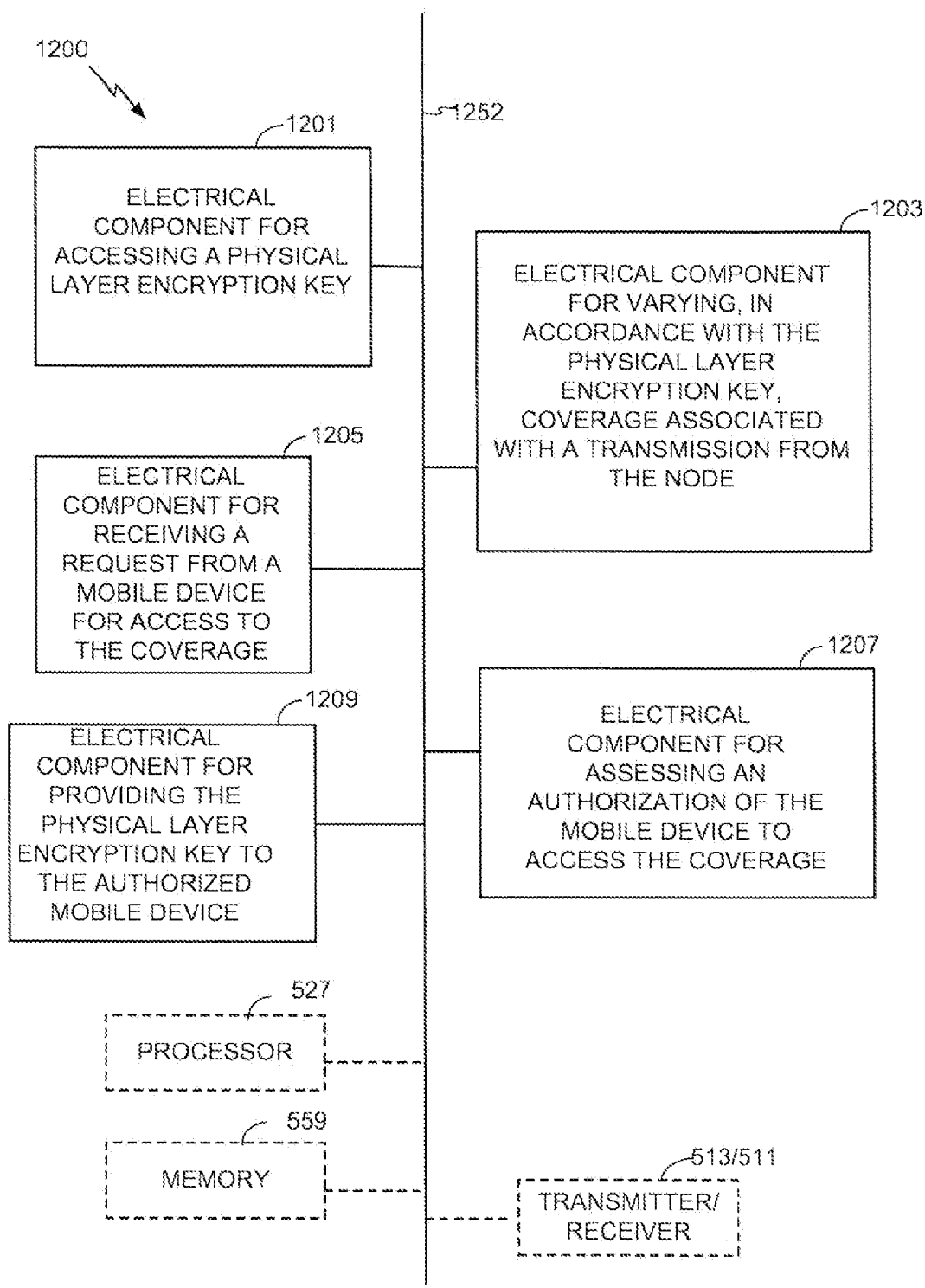
FIGS. 10 and 11 are block diagrams illustrating an exemplary apparatus that may be configured as a network entity according to embodiments of the present disclosure.

With reference to FIG. 10, there is provided an exemplary apparatus 1200 that may be configured as a network entity (a node, for example) in a wireless network, or as a processor or similar device/component for use within the network entity. The apparatus 1200 may include functional blocks that can represent functions implemented by a processor, software, or a combination thereof. For example, apparatus 1200 may include an electrical component or module 1201 (e.g., encryption module 533 of AP 102*x*) for accessing a physical layer encryption key. The apparatus 1200 may also include an electrical component or module 1203 (e.g., transmitter 513 of AP 102*x*) for varying, in accordance with the physical layer encryption key, coverage associated with transmission (from the node, for example). Electrical component or module 1205 (e.g. receiver 511 of AP 102*x*) may receive a request from a mobile device for access to the coverage. The apparatus 1200 may also include an electrical component or module 1207 (e.g., encryption module 533 of AP 102*x*) for assessing an authorization of the mobile device to access the coverage. Responsively to the request from an authorized one of the mobile device, the electrical component or module 1209 (e.g., transmitter 513 of AP 102*x*) may provide the physical layer encryption key to the authorized mobile device.

Figure 11:
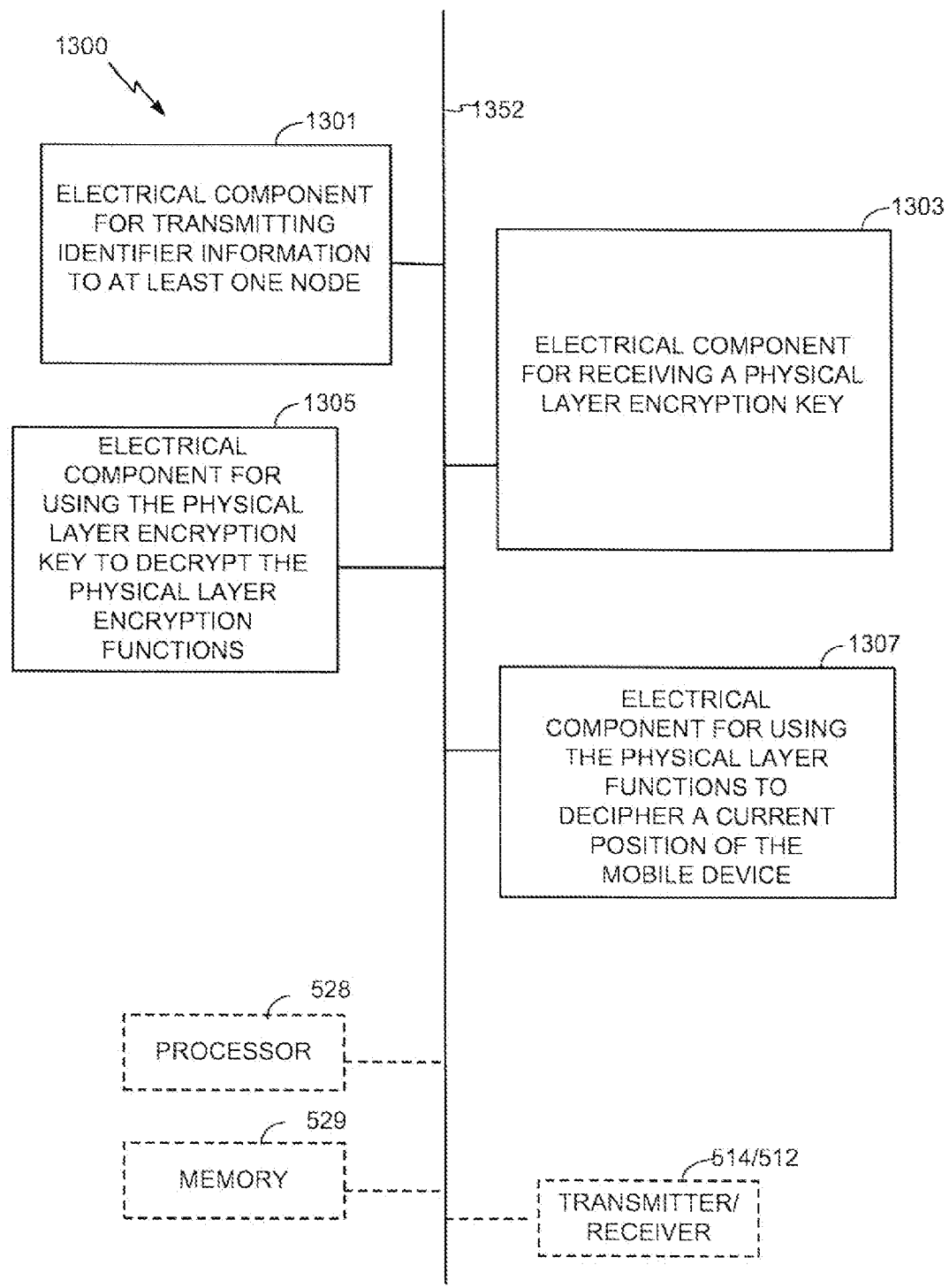

With reference to FIG. 11, there is provided an exemplary apparatus 1300 that may be configured as a network entity (a mobile device, for example) in a wireless network, or as a processor or similar device/component for use within the network entity. The apparatus 1300 may include functional blocks that can represent functions implemented by a processor, software, or a combination thereof (e.g., firmware). For example, apparatus 1300 may include an electrical component or module 1301 (e.g., transmitter 514 of device 120*x*) for transmitting identifier information to at least one node. Upon authentication of the mobile device by the at least one node, the apparatus 1300 may also include an electrical component or module 1303 (e.g., receiver 512 of device 120*x*) for receiving a physical layer encryption key. Electrical component or module 1305 (e.g., decryption module 536 of device 120*x*) may be for using the physical layer encryption key to decrypt the physical layer encryption functions. The apparatus 1300 may also include an electrical component or module 1307 (e.g., device positioning module 532) for using the physical layer functions to decipher a current position of the mobile device.

In related aspects, apparatus 1200 and 1300 may optionally include processor components 527 and 528 respectively, which may be in operative communication with the components 1201-1209, and 1301-1307 respectively, via buses 1252 and 1352, respectively, or via similar communication coupling. The processors 527 and 528 may affect initiation and scheduling of the processes or functions performed by electrical components 1201-1209 and 1301-1307.

In other related aspects, the apparatus described herein may include a radio transmitter/receiver components 513/511 and 514/512 respectively. A stand alone receiver and/or stand alone transmitter may be used in lieu of or in conjunction with transmitter/receiver components 513/511 and 514/512, respectively. When the apparatus 1200 and 1300 is a mobile device or similar network entity, that apparatus may also include a network interface (not shown) for connecting to one or more core network entities. Each of these apparatus 1200 and 1300 may optionally include a component for storing information, such as, for example, a memory device/component 559 and 529. The computer readable medium or the memory component 559 and 529 may be operatively coupled to the other components of the apparatus 1200 and 1300 such as via the bus 1252, 1352 or the like. The memory component 559 and 529 may be adapted to store computer readable instructions and data for affecting the processes and behavior of the components described in each of the apparatus, and subcomponents thereof, or the processors, or the methods disclosed herein. The memory components described herein may retain instructions for executing functions associated with the components each of the components of each of the apparatus. While shown as being external to the memory components, it is to be understood that each of the components can exist within the respective memory components. It is further noted that the components in FIGS. 10 and 11 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium.

Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of operating a device to access coverage of at least one node of a wireless network, comprising:
   a device transmitting identifier information to the at least one node; and
   upon authentication by the at least one node, the device receiving a physical layer encryption key comprising an encryption function table having therein time-varying functions of nodes of the wireless network, coverage areas of nodes of said wireless network varying with time in accordance with said time-varying functions, said time-varying functions including at least one of a time varying transmit power function, a time varying beam shape function, or a time varying beam direction function; and
   using the time varying functions included in the physical layer encryption key to make use of the wireless network as the coverage area of nodes vary with time in accordance with the time-varying functions.

2. The method of claim 1, further comprising:
   using said time-varying functions to determine the physical location of the position of the device based on signals received from nodes of the wireless network.

3. The method of claim 1, wherein the time varying functions comprise variable transmit power.

4. The method of claim 1, wherein the time varying functions comprise variable beam shape.

5. The method of claim 1, wherein the device is a subscriber station.

6. The method of claim 5, wherein the device is a mobile user equipment device.

7. A mobile device for accessing coverage of at least one node of a wireless network, comprising:
   means for transmitting identifier information to the at least one node; and
   upon authentication of the mobile device, means for receiving a physical layer encryption key comprising an encryption function table having therein time-varying functions of nodes of a wireless network, coverage areas of nodes of said wireless network varying with time in accordance with said time-varying functions, said time-varying functions including at least one of a time varying transmit power function, a time varying beam shape function, or a time varying beam direction function; and
   means for using the time varying functions included in the physical layer encryption key to make use of the wireless network as the coverage area of nodes vary with time in accordance with the time-varying functions.

8. The mobile device of claim 7, further comprising:
   means for using said time-varying functions to determine the physical location of the position of the device based on signals received from nodes of the wireless network.

9. The mobile device of claim 8, wherein said mobile device is a user equipment device.

10. The mobile device of claim 8, wherein the time varying functions comprise variable transmit power.

11. The mobile device of claim 8, wherein the time varying functions comprise variable beam shape.

12. The mobile device of claim 7, wherein said mobile device is a user equipment device.

13. A computer program product, comprising a non-transitory computer-readable medium associated with a mobile device in a wireless network, comprising:
   code for causing at least one processor associated with the mobile device to transmit identifier information to at least one node of the wireless network; and
   code for causing the at least one processor to, upon authentication of the transmitted identifier information by the at least one node, receive a physical layer encryption key comprising an encryption function table having therein time-varying functions of nodes of the wireless network, coverage areas of nodes of said wireless network varying with time in accordance with said time-varying functions, said time-varying functions including at least one of a time varying transmit power function, a time varying beam shape function, or a time varying beam direction function; and
   code for causing the at least one processor to use the time varying functions included in the physical layer encryption key to make use of the wireless network as the coverage area of nodes vary with time in accordance with the time-varying functions.

14. The computer program product of claim 13, further comprising:
   code for causing the at least one processor to use said time-varying functions to determine the physical location of the position of the device based on signals received from nodes of the wireless network.

15. The computer program product of claim 13, further comprising code for causing the at least one processor to decrypt a coverage of the at least one node using the physical layer encryption key.

16. The computer program product of claim 15, further comprising code for causing the at least one processor to access the coverage pursuant to the decryption.

17. A mobile device for accessing coverage of at least one node in a wireless network, comprising:
- a transmitter configured to transmit identifier information to the at least one node; and
- a receiver configured to receive, upon authentication by the at least one node, a physical layer encryption key comprising an encryption function table having therein time-varying functions of nodes of the wireless network, coverage areas of nodes of said wireless network varying with time in accordance with said time-varying functions, said time-varying functions including at least one of a time varying transmit power function, a time varying beam shape function, or a time varying beam direction function; and
- a module configured to use the time varying functions included in the physical layer encryption key to make use of the wireless network as the coverage area of nodes vary with time in accordance with the time-varying functions.

18. The mobile device of claim 17, wherein the time varying functions comprise variable transmit power.

19. The mobile device of claim 17, wherein the time varying functions comprise variable beam shape.

20. The mobile device of claim 17, further comprising:
- a module configured to use said time-varying functions to determine the physical location of the position of the device based on signals received from nodes of the wireless network.

21. The mobile device of claim 20, wherein the mobile device is a user equipment device.

22. The mobile device of claim 21, wherein the mobile device is a subscriber station.

* * * * *